(12) United States Patent
Nie

(10) Patent No.: US 9,967,071 B2
(45) Date of Patent: May 8, 2018

(54) BASEBAND DATA STORAGE CONTROL METHOD AND DEVICE AND STORAGE MEDIUM

(71) Applicant: SANECHIPS TECHNOLOGY CO., LTD., Guangdong (CN)

(72) Inventor: Cong Nie, Guangdong (CN)

(73) Assignee: SANECHIPS TECHNOLOGY CO., LTD., Shenzhen, Guangdong (CN)

( * ) Notice: Subject to any disclaimer, the term of this patent is extended or adjusted under 35 U.S.C. 154(b) by 165 days.

(21) Appl. No.: 15/036,524

(22) PCT Filed: May 19, 2014

(86) PCT No.: PCT/CN2014/077828
§ 371 (c)(1),
(2) Date: May 13, 2016

(87) PCT Pub. No.: WO2014/183682
PCT Pub. Date: Nov. 20, 2014

(65) Prior Publication Data
US 2016/0294522 A1  Oct. 6, 2016

(30) Foreign Application Priority Data
Nov. 15, 2013 (CN) .......................... 2013 1 0574802

(51) Int. Cl.
*H04L 5/00* (2006.01)
*H04W 72/00* (2009.01)
(Continued)

(52) U.S. Cl.
CPC ........ *H04L 5/0048* (2013.01); *H04L 27/2607* (2013.01); *H04W 16/18* (2013.01);
(Continued)

(58) Field of Classification Search
CPC .. H04L 27/2607; H04L 5/0048; H04W 16/18; H04W 24/02; H04W 48/00; H04W 72/00
See application file for complete search history.

(56) References Cited

U.S. PATENT DOCUMENTS

2001/0051532 A1\* 12/2001 Voyer .................... H04W 16/28
455/562.1
2002/0097846 A1\* 7/2002 Jung, II ................ H04M 15/00
379/88.13
(Continued)

FOREIGN PATENT DOCUMENTS

| CN | 101527624 | 9/2009 |
|---|---|---|
| CN | 101777077 | 7/2010 |

OTHER PUBLICATIONS

International Search Report for PCT/CN2014/077828 dated Sep. 2, 2014, 4 pages.

*Primary Examiner* — Dung B Huynh
(74) *Attorney, Agent, or Firm* — Nixon & Vanderhye PC

(57) ABSTRACT

The present disclosure discloses a baseband data storage control method, including: receiving cell configuration information of each subframe, mapping each cell into a preset cell set according to bandwidth and quantity of antennas in the cell configuration information, where each cell set corresponds to a random storage region; analyzing each cell included in each cell set and cell parameters corresponding to each cell, and computing storage addresses for each cell in the random storage region according to obtained cell parameters; and storing received baseband data into a random storage region corresponding to a cell to which the baseband data belong, according to the computed storage address. The present disclosure further discloses a baseband data storage control device.

20 Claims, 7 Drawing Sheets

(51) Int. Cl.
*H04L 27/26* (2006.01)
*H04W 16/18* (2009.01)
*H04W 24/02* (2009.01)
*H04W 48/00* (2009.01)

(52) U.S. Cl.
CPC ........... *H04W 24/02* (2013.01); *H04W 72/00* (2013.01); *H04W 48/00* (2013.01)

(56) References Cited

U.S. PATENT DOCUMENTS

| | | | | |
|---|---|---|---|---|
| 2003/0124979 A1* | 7/2003 | Tanada | H04W 84/20 | 455/41.1 |
| 2003/0174699 A1 | 9/2003 | Van Asten et al. | | |
| 2005/0003865 A1* | 1/2005 | Lastinger | H01Q 3/2605 | 455/562.1 |
| 2005/0160181 A1* | 7/2005 | Kwon | H04L 1/0002 | 709/238 |
| 2007/0155429 A1* | 7/2007 | Levy | H04W 24/10 | 455/557 |
| 2007/0281676 A1* | 12/2007 | Borras | H04M 1/2745 | 455/418 |
| 2008/0013516 A1* | 1/2008 | Zhang | H04J 11/0069 | 370/342 |
| 2008/0167064 A1* | 7/2008 | Bar-Ness | H04W 52/146 | 455/522 |
| 2009/0262868 A1* | 10/2009 | Mohammed | H04L 25/03006 | 375/340 |
| 2009/0323855 A1* | 12/2009 | Han | H04J 13/0059 | 375/295 |
| 2010/0034314 A1* | 2/2010 | Brown | H04W 36/0055 | 375/295 |
| 2010/0046360 A1* | 2/2010 | Tsuboi | H04J 11/0069 | 370/210 |
| 2010/0050274 A1* | 2/2010 | Miki | H04L 63/10 | 726/29 |
| 2010/0062790 A1* | 3/2010 | Wigren | G01S 5/02 | 455/456.1 |
| 2010/0205312 A1* | 8/2010 | Yasuma | H04L 12/2838 | 709/228 |
| 2010/0285825 A1* | 11/2010 | Doppler | H04W 28/22 | 455/509 |
| 2011/0117925 A1* | 5/2011 | Sampath | H04W 64/00 | 455/456.1 |
| 2011/0128950 A1* | 6/2011 | Tomita | H04W 92/12 | 370/339 |
| 2011/0149771 A1* | 6/2011 | Abeta | H04J 11/0063 | 370/252 |
| 2011/0217961 A1* | 9/2011 | Kameno | H04W 68/12 | 455/414.1 |
| 2012/0033625 A1* | 2/2012 | Nagata | H04L 5/0023 | 370/329 |
| 2012/0108254 A1* | 5/2012 | Kwon | H04L 5/0023 | 455/450 |
| 2012/0113967 A1* | 5/2012 | Smith | H04B 1/7143 | 370/338 |
| 2012/0218139 A1* | 8/2012 | Suzuki | G01S 3/74 | 342/189 |
| 2013/0136068 A1* | 5/2013 | Johansson | H04W 88/085 | 370/329 |
| 2013/0223378 A1* | 8/2013 | Gao | H04L 5/0053 | 370/329 |
| 2013/0223397 A1* | 8/2013 | Kim | H04L 5/0023 | 370/329 |
| 2013/0315113 A1* | 11/2013 | Seo | H04L 5/001 | 370/280 |
| 2014/0302867 A1* | 10/2014 | Mizusawa | H04W 16/16 | 455/452.1 |

\* cited by examiner

|  | RAM0 | RAM1 | RAM2 | RAM3 | |
|---|---|---|---|---|---|
| Ant0 { | Symb0~2_0<br>Symb4~9_0<br>Symb11~14_0 | Symb0~2_1<br>Symb4~9_1<br>Symb11~14_1 | Symb0~2_2<br>Symb4~9_2<br>Symb11~14_2 | Symb0~2_3<br>Symb4~9_3<br>Symb11~14_3 | 0<br>•<br>•<br>•<br>3600 |
| Ant1 { | Symb0~2_3<br>Symb4~9_3<br>Symb11~14_3 | Symb0~2_0<br>Symb4~9_0<br>Symb11~14_0 | Symb0~2_1<br>Symb4~9_1<br>Symb11~14_1 | Symb0~2_2<br>Symb4~9_2<br>Symb11~14_2 | •<br>•<br>•<br>7200 |

|  | RAM4 | RAM5 | RAM6 | RAM7 | |
|---|---|---|---|---|---|
| Ant2 { | Symb0~2_0<br>Symb4~9_0<br>Symb11~14_0 | Symb0~2_1<br>Symb4~9_1<br>Symb11~14_1 | Symb0~2_2<br>Symb4~9_2<br>Symb11~14_2 | Symb0~2_3<br>Symb4~9_3<br>Symb11~14_3 | 0<br>•<br>•<br>•<br>3600 |
| Ant3 { | Symb0~2_3<br>Symb4~9_3<br>Symb11~14_3 | Symb0~2_0<br>Symb4~9_0<br>Symb11~14_0 | Symb0~2_1<br>Symb4~9_1<br>Symb11~14_1 | Symb0~2_2<br>Symb4~9_2<br>Symb11~14_2 | •<br>•<br>•<br>7200 |

Fig. 4

|  | RAM0 | RAM1 | RAM2 | RAM3 |  |
|---|---|---|---|---|---|
|  | Symb0_0 | Symb0_1 | Symb0_2 | Symb0_3 | 0 |
| Symbol0 | ⋮ | ⋮ | ⋮ | ⋮ | ⋮ |
|  | Symb0_1196 | Symb0_1197 | Symb0_1198 | Symb0_1199 | 300 |
|  | Symb1_0 | Symb1_1 | Symb1_2 | Symb1_3 |  |
| Symbol1 | ⋮ | ⋮ | ⋮ | ⋮ | ⋮ |
|  | Symb1_1196 | Symb1_1197 | Symb1_1198 | Symb1_1199 | 600 |
|  | Symb2_0 | Symb2_1 | Symb2_2 | Symb2_3 |  |
| Symbol2 | ⋮ | ⋮ | ⋮ | ⋮ | ⋮ |
|  | Symb2_1196 | Symb2_1197 | Symb2_1198 | Symb2_1199 | 900 |
|  | Symb4_0 | Symb4_1 | Symb4_2 | Symb4_3 |  |
| Symbol4 | ⋮ | ⋮ | ⋮ | ⋮ | ⋮ |
|  | Sym4_1196 | Symb4_1197 | Symb4_1198 | Symb4_1199 | 1200 |
|  | ⋮ | ⋮ | ⋮ | ⋮ | ⋮ |
|  |  |  |  |  | 2400 |
|  | Symb9_0 | Symb9_1 | Symb9_2 | Symb9_3 |  |
| Symbol9 | ⋮ | ⋮ | ⋮ | ⋮ | ⋮ |
|  | Symb9_1196 | Symb9_1197 | Symb9_1198 | Symb9_1199 | 2700 |
|  | Symb11_0 | Symb11_1 | Symb11_2 | Symb11_3 |  |
| Symbol11 | ⋮ | ⋮ | ⋮ | ⋮ | ⋮ |
|  | Symb11_1196 | Symb11_1197 | Symb11_1198 | Symb11_1199 | 3000 |
|  | Symb12_0 | Symb12_1 | Symb12_2 | Symb12_3 |  |
| Symbol12 | ⋮ | ⋮ | ⋮ | ⋮ | ⋮ |
|  | Symb12_1196 | Symb12_1197 | Symb12_1198 | Symb12_1199 | 3300 |
|  | Symb13_0 | Symb13_1 | Symb13_2 | Symb13_3 |  |
| Symbol13 | ⋮ | ⋮ | ⋮ | ⋮ | ⋮ |
|  | Symb13_1196 | Symb13_1197 | Symb13_1198 | Symb13_1199 | 3600 |

Fig. 5

|  | RAM0 | RAM1 | RAM2 | RAM3 | |
|---|---|---|---|---|---|
| Ant0 | Symb0~2_0<br>Symb4~9_0<br>Symb11~14_0 | Symb0~2_1<br>Symb4~9_1<br>Symb11~14_1 | Symb0~2_2<br>Symb4~9_2<br>Symb11~14_2 | Symb0~2_3<br>Symb4~9_3<br>Symb11~14_3 | 0<br>⋮<br>1800 |
| Ant1 | Symb0~2_3<br>Symb4~9_3<br>Symb11~14_3 | Symb0~2_0<br>Symb4~9_0<br>Symb11~14_0 | Symb0~2_1<br>Symb4~9_1<br>Symb11~14_1 | Symb0~2_2<br>Symb4~9_2<br>Symb11~14_2 | ⋮<br>3600 |
| Ant2 | Symb0~2_<br>Symb4~9_2<br>Symb11~14_2 | Symb0~2_3<br>Symb4~9_3<br>Symb11~14_3 | Symb0~2_0<br>Symb4~9_0<br>Symb11~14_0 | Symb0~2_1<br>Symb4~9_1<br>Symb11~14_1 | ⋮<br>5400 |
| Ant3 | Symb0~2_1<br>Symb4~9_1<br>Symb11~14_1 | Symb0~2_2<br>Symb4~9_2<br>Symb11~14_2 | Symb0~2_3<br>Symb4~9_3<br>Symb11~14_3 | Symb0~2_0<br>Symb4~9_0<br>Symb11~14_0 | ⋮<br>7200 |

|  | RAM4 | RAM5 | RAM6 | RAM7 | |
|---|---|---|---|---|---|
| Ant4 | Symb0~2_0<br>Symb4~9_0<br>Symb11~14_0 | Symb0~2_1<br>Symb4~9_1<br>Symb11~14_1 | Symb0~2_2<br>Symb4~9_2<br>Symb11~14_2 | Symb0~2_3<br>Symb4~9_3<br>Symb11~14_3 | 0<br>⋮<br>1800 |
| Ant5 | Symb0~2_3<br>Symb4~9_3<br>Symb11~14_3 | Symb0~2_0<br>Symb4~9_0<br>Symb11~14_0 | Symb0~2_1<br>Symb4~9_1<br>Symb11~14_1 | Symb0~2_2<br>Symb4~9_2<br>Symb11~14_2 | ⋮<br>3600 |
| Ant6 | Symb0~2_<br>Symb4~9_2<br>Symb11~14_2 | Symb0~2_3<br>Symb4~9_3<br>Symb11~14_3 | Symb0~2_0<br>Symb4~9_0<br>Symb11~14_0 | Symb0~2_1<br>Symb4~9_1<br>Symb11~14_1 | ⋮<br>5400 |
| Ant7 | Symb0~2_1<br>Symb4~9_1<br>Symb11~14_1 | Symb0~2_2<br>Symb4~9_2<br>Symb11~14_2 | Symb0~2_3<br>Symb4~9_3<br>Symb11~14_3 | Symb0~2_0<br>Symb4~9_0<br>Symb11~14_0 | ⋮<br>7200 |

Fig. 6

|  | RAM0 | RAM1 | RAM2 | RAM3 |  |
|---|---|---|---|---|---|
| | Symb1_0 | Symb0_1 | Symb0_2 | Symb0_3 | 0 |
| Symbol0 | ⋮ | ⋮ | ⋮ | ⋮ | ⋮ |
| | Symb1196_0 | Symb0_597 | Symb0_598 | Symb0_599 | 150 |
| | Symb1_0 | Symb1_1 | Symb1_2 | Symb1_3 | |
| Symbol1 | ⋮ | ⋮ | ⋮ | ⋮ | ⋮ |
| | Symb1196_0 | Symb1_597 | Symb1_598 | Symb1_599 | 300 |
| | Symb1_0 | Symb2_1 | Symb2_2 | Symb2_3 | |
| Symbol2 | ⋮ | ⋮ | ⋮ | ⋮ | ⋮ |
| | Symb1196_0 | Symb2_597 | Symb2_598 | Symb2_599 | 450 |
| | Symb1_0 | Symb4_1 | Symb4_2 | Symb4_3 | |
| Symbol4 | ⋮ | ⋮ | ⋮ | ⋮ | ⋮ |
| | Symb1196_0 | Symb4_597 | Symb4_598 | Symb4_599 | 600 |
| | ⋮ | ⋮ | ⋮ | ⋮ | ⋮ |
| | Symb1_0 | Symb9_1 | Symb9_2 | Symb9_3 | 1200 |
| Symbol9 | ⋮ | ⋮ | ⋮ | ⋮ | ⋮ |
| | Symb1196_0 | Symb9_597 | Symb9_598 | Symb9_599 | 1350 |
| | Symb1_0 | Symb11_1 | Symb11_2 | Symb11_3 | |
| Symbol11 | ⋮ | ⋮ | ⋮ | ⋮ | ⋮ |
| | Symb1196_0 | Symb11_597 | Symb11_598 | Symb11_599 | 1500 |
| | Symb1_0 | Symb12_1 | Symb12_2 | Symb12_3 | |
| Symbol12 | ⋮ | ⋮ | ⋮ | ⋮ | ⋮ |
| | Symb1196_0 | Symb12_597 | Symb12_598 | Symb12_599 | 1650 |
| | Symb1_0 | Symb13_1 | Symb13_2 | Symb13_3 | |
| Symbol13 | ⋮ | ⋮ | ⋮ | ⋮ | ⋮ |
| | Symb1196_0 | Symb13_597 | Symb13_598 | Symb13_599 | 1800 |

Fig. 7

|  | RAM0 | RAM1 | RAM2 | RAM3 | |
|---|---|---|---|---|---|
| Symbol0 cell0 | Symb1_0 ⋮ Symb1196_0 | Symb0_1 ⋮ Symb0_297 | Symb0_2 ⋮ Symb0_298 | Symb0_3 ⋮ Symb0_299 | 0 ⋮ 75 |
| cell1 | Symb0_0 Symb0_296 | Symb0_1 Symb0_297 | Symb0_2 Symb0_298 | Symb0_3 Symb0_299 | 149 |

Fig. 8

|  | RAM0 | RAM1 | RAM2 | RAM3 | |
|---|---|---|---|---|---|
| cell0 | Symb1_0 ⋮ Symb1196_0 | Symb0_1 ⋮ Symb0_197 | Symb0_2 ⋮ Symb0_198 | Symb0_3 ⋮ Symb0_199 | 0 ⋮ 50 |
| Symbol0 cell1 | Symb0_0 Symb0_196 | Symb0_1 Symb0_197 | Symb0_2 Symb0_198 | Symb0_3 Symb0_199 | 100 |
| cell2 | Symb0_0 Symb0_196 | Symb0_1 Symb0_197 | Symb0_2 Symb0_198 | Symb0_3 Symb0_199 | 149 |

Fig. 9

BASEBAND DATA STORAGE CONTROL METHOD AND DEVICE AND STORAGE MEDIUM

This application is the U.S. national phase of International Application No. PCT/CN2014/077828 filed 19 May 2014 which designated the U.S. and claims priority to CN Patent Application No. 201310574802.9 filed 15 Nov. 2013, the entire contents of each of which are hereby incorporated by reference.

TECHNICAL FIELD

The present disclosure relates to data storage control technologies in the field of wireless communications, and in particular, to a baseband data storage control method and device, and a storage medium.

BACKGROUND

As a core of a Fourth Generation Mobile Communication, a Long Term Evolution (LTE) technology has always been a research emphasis in the field of mobile communications due to existence of problems such as large baseband signal data throughput, high algorithm complexity, large overhead in implementation and strict requirements for delay constraint in processing procedure, etc. These problems are arisen from a communication system in LTE mode having great flexibility in cell configuration, for example, mixing of Time Classifying Duplexing (TDD) and Frequency Classifying Duplexing (FDD), mixing of different bandwidths, mixing of different quantities of antennas and cross mixing of various cases mentioned above, and mixing of a normal Cyclic Prefix (CP) and an extended CP.

For example, a normal CP is adopted in a configuration, namely, seven Orthogonal Frequency-Classifying Multiplexing (OFDM) symbols may be transmitted in a slot; and an extended CP is adopted in another configuration, namely, six OFDM symbols may be transmitted in a slot. These flexible configurations also bring larger complexity, and different configurations will lead to diversification of demodulated data, so that on one hand complexity in data storage is increased, and on the other hand convenience for obtaining data by subsequent computation is affected. Therefore, advantages and disadvantages of a baseband data storage control method have a relatively important effect on performance of a whole system.

An existing scheme for implementing baseband data storage control has following disadvantages:

1) partitioning baseband data for storage control only according to different antennas is unable to distinguish cell data having different bandwidths on a same antenna, thus it is not flexible enough to dispatch, select and process multiple cell data;

2) no detailed analysis and consideration is made regarding whether or not storage space can be multiplexed by antennas, instead, number of memories is added in equal proportion according to increasement of antenna quantity, which is likely result in redundancy and waste of resources; and 3) baseband data are received and stored according to a time sequence of radio frames, and baseband data are not classified according to attributes such as data cells and antennas or the like; this data storage method is disadvantageous to addressing of certain piece of data, and thus is unable to meet requirements of data processing in the case of flexible scheduling of base stations.

Therefore, in baseband data storage control methods in the related art, a universal problem is to perform a classification and storage on received data according to a certain separate attribute, no matter a corresponding storage is performed according to symbols and slots on a basis of a time sequence of radio frames, or a corresponding storage is performed according to different antennas, or a storage is performed according to different cells, or an integrated data storage is performed without induction of any attribute, processing requirements for complex cell configuration in a base station are unable to be flexibly met, and redundancy and consumption of data storage are likely to be caused.

SUMMARY

In order to solve the foregoing technical problems, embodiments of the present disclosure provide a baseband data storage control method and device, and a storage medium, which not only can flexibly support addressing of baseband data under various configurations for ease of data access, but also can maximize the multiplexing of storage space to reduce the consumption of hardware resources.

The technical solution of the present disclosure is implemented in this way.

Embodiments of the present disclosure provide a baseband data storage control method, and the method includes:

receiving cell configuration information in each subframe, mapping each cell into a preset cell set according to bandwidth and quantity of antennas in the cell configuration information, where each cell set corresponds to a random storage region;

analyzing each cell included in each cell set and cell parameters corresponding to each cell, and computing storage addresses for each cell in the random storage region according to obtained cell parameters; and storing received baseband data into a random storage region corresponding to a cell to which the baseband data belong, according to the computed storage address.

In the above solution, the preset cell set includes four cell sets, and a maximum data throughput of each cell set is a data volume of a cell with bandwidth of 20 M and four antennas.

In the above solution, the cell parameters include cell bandwidth, number of antennas, cell number and cyclic prefix type.

In the above solution, the computing storage addresses for each cell in the random storage region according to obtained cell parameters includes:

first classifying cells into four types according to cell bandwidth; then classifying the cells into eight types according to number of antennas on a basis of the classifying according to the cell bandwidth; then classifying the cells into nine types according to the cell number on a basis of the classifying according to number of antennas; and finally, obtaining an offset address of each symbol received by each antenna of each type of cell according to cyclic prefix on a basis of the classifying according to cell number.

In the above solution, the random storage region includes four random access memory groups configured to store baseband data; and each random access memory group is composed of two random access memories including ping and pong.

Embodiments of the present disclosure further provide a baseband data storage control device, which includes: a cell parameter receiving and parsing module, an antenna data receiving and routing module and a baseband data random access module, where, the cell parameter receiving and parsing module is configured to receive cell configuration information in each subframe, and map each cell into a preset cell set according to bandwidth and quantity of antennas in the cell configuration information, where each cell set corresponds to a random storage region;

the antenna data receiving and routing module is configured to analyze each cell included in each cell set and cell parameters corresponding to each cell, and compute storage addresses for each cell in the random storage region according to obtained cell parameters; and the baseband data random access module is configured to store received baseband data into a random storage region corresponding to a cell to which the baseband data belong, according to the computed storage address.

In the above solution, the computing, by the antenna data receiving and routing module, storage addresses for each cell in the random storage region according to obtained cell parameters includes:

first classifying cells into four types according to cell bandwidth; then classifying the cells into eight types according to number of antennas on a basis of the classifying according to the cell bandwidth; then classifying the cells into nine types according to the cell number on a basis of the classifying according to number of antennas; and finally obtaining an offset address of each symbol in each antenna of each type of cell according to cyclic prefix on a basis of the classifying according to cell number.

In the above solution, the baseband data random access module includes four random access memory groups configured to store baseband data; and each random access memory group is composed of two random access memories including ping and pong.

A storage medium is provided, in which a computer program is stored, and the computer program is configured to execute the aforementioned baseband data storage control method.

The baseband data storage control method and device provided by embodiments of the present disclosure include: receiving cell configuration information in each subframe, mapping each cell into a preset cell set according to bandwidth and quantity of antennas in the cell configuration information, where each cell set corresponds to a random storage region; analyzing each cell included in each cell set and cell parameters corresponding to each cell, and computing storage addresses for each cell in the random storage region according to obtained cell parameters; and storing received baseband data into a random storage region corresponding to a cell to which the baseband data belong, according to the computed storage address. In this way, in embodiments of the present disclosure, in combination with diversified and flexible cell configuration of an LTE base station and on a basis of an overall consideration of different bandwidths, number of cells, number of antennas, TDD and CP, baseband data are subjected to optimized storage control according to a regular rule which not only can flexibly support addressing of baseband data under various configurations, thereby meeting convenience for data reading and storing in subsequent baseband processing steps, but also can maximize multiplexing of storage space to reduce consumption of hardware resources.

Compared with the existing art, use of the method and device as mentioned in embodiments of the present disclosure has following beneficial effects:

1) in embodiments of the present disclosure, data are classified after making an overall consideration of various factors such as cell, antenna, bandwidth and time sequence or the like, storage and simple control of baseband data in a unified rule can be satisfied under complex configuration of base stations;

2) in embodiments of the present disclosure, number of memories and a total consumption of resources can be reduced furthest by summarizing multiplexing situation of storage spaces under various configuration conditions; and 3) in embodiments of the present disclosure, use of an interleaving setting of storage can meet simultaneous output of data of up to eight antennas, and meet processing efficiency of Multiple-Input Multiple-Out-put (MIMO) data of a large quantity of antennas for users, so as to provide necessary conditions for high precision operations such as multiple-antenna processing and interference elimination for the system.

BRIEF DESCRIPTION OF THE DRAWINGS

FIG. 4 is a schematic diagram showing a data storage format of a cell with 4 antennas and 20 M;

FIG. 5 is a schematic diagram showing a specific storage arrangement of data of antenna 0;

FIG. 6 is a schematic diagram showing a data storage format of a cell with 8 antennas and 10 M;

FIG. 7 is a schematic diagram showing distribution specifically orientating to a symbol datum of an antenna;

FIG. 8 is a schematic diagram showing a data storage format of two cells each with 8 antennas and 5 M; and FIG. 9 is a schematic diagram showing a data storage format of three cells each with 8 antennas and 3/1.4 M.

DETAILED DESCRIPTION OF EMBODIMENTS

A basic idea of embodiments of the present disclosure includes: receiving cell configuration information of each subframe, mapping each cell into a preset cell set according to bandwidth and quantity of antennas in the cell configuration information, where each cell set corresponds to a random storage region; analyzing each cell included in each cell set and cell parameters corresponding to each cell, and computing storage addresses for each cell in the random storage region according to obtained cell parameters; and storing received baseband data into the random storage region corresponding to the cell to which the baseband data belong, according to the computed storage address.

Here, there may be four cell sets specifically classified according to bandwidth and quantity of antennas. Cell configuration information includes: total number of cells, number of cells being respectively configured on each optical path (generally being antenna data of three paths of optical ports), bandwidth of each cell, number of antennas in each cell, and CP type of each cell or the like. The random storage region is a random access memory (RAM) group.

A maximum data rate of a data sample point on each optical path is one cell with 8 antennas and 20 M. Therefore, to a configuration of one cell with 4 antennas and 20 M, a maximum data rate may support two cells each with 4 antennas and 20 M. Similarly, it can be derived that a configuration of one cell with 4 antennas and 20 M is equivalent to that of two cells each with 4 antennas and 10 M or three cells each with 4 antennas and 5 M/3 M/1.4 M.

Following further describes the method and device set forth in the present disclosure with reference to the accompanying drawings and embodiments.

Figure 1:
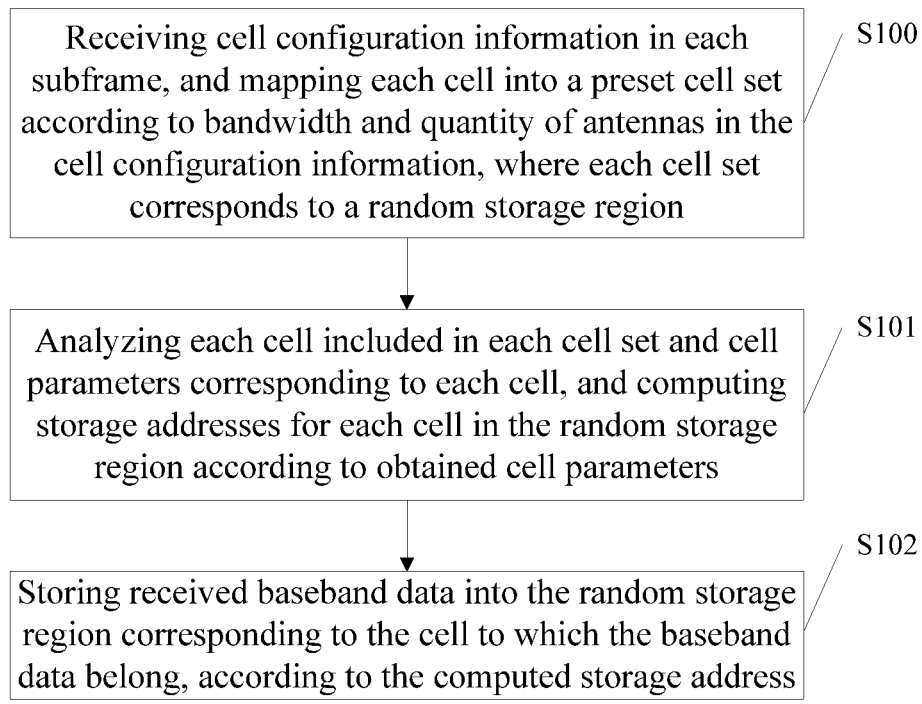
FIG. 1 is a schematic flow chart for implementing a baseband data storage control method according to embodiments of the present disclosure.

Embodiments of the present disclosure provide a baseband data storage control method, as shown in FIG. 1, the baseband data storage control method according to embodiments of the present disclosure includes:

Step S100: receiving cell configuration information in each subframe, and mapping each cell into a preset cell set according to bandwidth and quantity of antennas in the cell configuration information, where each cell set corresponds to a random storage region.

Here, there may be four cell sets which are classified according to bandwidth and quantity of antennas, and correspond to four random storage regions. For example, if a data volume of a cell with a bandwidth of 20 M and four antennas is classified according to a maximum data throughput of each cell set, a data volume of the cell needs to be classified into two parts and respectively mapped into two cell sets for processing when configuring a cell with 8 antennas and 20 M under an LTE Time Classifying Duplexing (TDD) mode. Therefore, the four cell sets in embodiments of the present disclosure can support a data volume of up to two cells each with 8 antennas and 20 M, and such a capacity can meet requirements of operators at the present stage.

In practical application, a maximum data volume of a single cell supported by four cell sets is a data volume of a cell with 8 antennas and 20 M under a TDD mode, and up to two such cells can be supported, which is a case having a maximum data volume in all configurations. In other words, a random storage region corresponding to each cell set can store a data volume of a cell with a bandwidth of 20 M and four antennas. Therefore, in implementation of application specific to a maximum data volume, three cell groups respectively corresponding to three paths of optical ports are disposed first. Each random storage region supports to store a data volume of 4 antennas and 20 M, and four random storage regions of 4 antennas and 20 M may be flexibly and dynamically allocated to three cells groups so as to meet various cell combinations and configurations on an optical port corresponding to each cell group.

Specifically, cell and antenna configurations corresponding to the three cell groups are as shown in Table 1, in which corresponding configurations of cell, bandwidth and antenna in each cell group are shown. In Table 1, group0, 1 and 2 represent three cell groups, cell represents cells included in a cell group, BW represents bandwidth, and Ant_num represents a specific antenna number.

TABLE 1

| group | cell | BW | Ant _ num |
|---|---|---|---|
| group0/1 | cell0 | 20M/15M/10M/5M/3M/1.4M | 8/4/2/1 |
| | cell1 | 20M/15M | 2/1 |
| | | 10M | 4/2/1 |
| | | 5M/3M/1.4M | 8/4/2/1 |
| | cell2 | 5M | 4/2/1 |
| | | 3M/1.4M | 8/4/2/1 |
| group2 | cell0 | 20/15M | 4/2/1 |
| | | 10M/5M/3M1.4M | 8/4/2/1 |

TABLE 1-continued

| group | cell | BW | Ant _ num |
|---|---|---|---|
| | cell1 | 20M/15M | 2/1 |
| | | 10M | 4/2/1 |
| | | 5M/3M/1.4M | 8/4/2/1 |
| | cell2 | 5M | 4/2/1 |
| | | 3M/1.4M | 8/4/2/1 |

On a basis of corresponding configurations of cell, bandwidth and antenna in each cell group in Table 1, a corresponding relation between cell set and cell group is established, as shown in Table 2, which shows corresponding configurations of cells each with 8 antennas and 20 M. In Table 2, label deofdm_index 0, 1, 2 and 3 are just corresponding to arranged cell sets 0, 1, 2 and 3. Cell config represents cell configuration, and specifically indicates antenna number and bandwidth of a corresponding cell, for example, a cell with 8 antennas and 20 M. AI_index represents sequence number of cell groups; and type is determined according to data storage situation of cell each with 8 antennas and 20 M in the three cell groups.

TABLE 2

| type | AI_index | Cell config | deofdm_index |
|---|---|---|---|
| 1 | 0 | One cell with 8 antennas and 20M | 0 and 1 |
| | 1 | One cell with 8 antennas and 20M | 2 and 3 |
| | 2 | None | None |
| 2 | 0 | One cell with 8 antennas and 20M | 0 and 3 |
| | 1 | Other | 1 |
| | 2 | Other | 2 |
| 3 | 0 | Other | 0 |
| | 1 | One cell with 8 antennas and 20M | 1 and 3 |
| | 2 | Other | 2 |
| 4 | 0 | Other | 0 |
| | 1 | Other | 1 |
| | 2 | Other | 2 |

As can be seen from a specific analysis, a configuration of a cell with 8 antennas and 20 M is relatively special, thus a special description of the configuration is made as follows: in practical application, at most two cells each with 8 antennas and 20 M may be configured, and the two cells are respectively positioned in cell 0 of cell group 0 and cell 0 of cell group 1. If there is one cell with 8 antennas and 20 M, the cell may be positioned in cell 0 of cell group 0 or cell 0 of cell group 1.

Meanwhile, relations between cell groups and cell sets may also be determined according to these configurations. If there are two cells each with 8 antennas and 20 M, cell group 0 will be corresponding to labels deofdm_index 0 and 1, namely, cell sets 0 and 1, and cell group 1 will be corresponding to labels deofdm_index 2 and 3, namely, cell sets 2 and 3. If there is only one cell with 8 antennas and 20 M and the cell is positioned in cell group 0, cell group 0 will be corresponding to labels deofdm_index 0 and 3, namely, cell sets 0 and 3. If there is only one cell with 8 antennas and 20 M and the cell is positioned in cell group 1, cell group 1 will be corresponding to labels deofdm_index 1 and 3, namely, cell sets 1 and 3. Under other configurations, a cell set consistent with a label of a cell group is adopted, for example, cell group 2 is corresponding to the label deofdm_index 2, namely, cell set 2.

Step S101: analyzing each cell included in each cell set and cell parameters corresponding to each cell, and computing storage addresses for each cell in the random storage region according to obtained cell parameters.

Here, the storage address actually is an offset address of each cell in the corresponding random storage region; and the cell parameter includes cell bandwidth, number of antennas, cell number and CP type, etc.

The computing storage addresses for each cell according to obtained cell parameters includes: classifying cell configuration information into four types according to cell bandwidth; classifying the cell configuration information into eight types according to number of antennas on a basis of the classifying according to cell bandwidth; classifying the cell configuration information into nine types according to cell number on a basis of the classifying according to number of antennas; and obtaining the offset address of each symbol in each type according to situation of cyclic prefix on a basis of the classifying according to cell number.

Here, for data of each sampling point of a certain cell, an address corresponding to the data of the sampling point in a random storage region may be conveniently obtained according to cell-related parameters after storage addresses for each cell are computed, so as to provide extremely convenient data reading and writing conditions for various complex algorithms during subsequent baseband processing, and to accelerate computing performance for subsequent procedures. More importantly, superposition rules for different cell configurations are fully taken into account by such an addressing algorithm, so that multiplexing of the storage space is maximized to reduce consumption of hardware resources and size of chips.

Step S102: storing received baseband data into the random storage region corresponding to the cell to which the baseband data belong, according to the computed storage address.

Specifically, a final storage address of baseband data is determined for the received baseband data according to both the random storage region corresponding to the cell set mapped in Step S100 as well as the offset address computed in Step S101, and received baseband data are stored in the finally determined storage address.

Here, the random storage region includes four random access memory groups configured to store baseband data, and the four random access memory groups are corresponding to four cell sets preset in Step S100. Each random access memory group may be composed of two random access memories including ping and pong, and includes eight simple 32×7200 dual-port random access memories in total.

Figure 2:
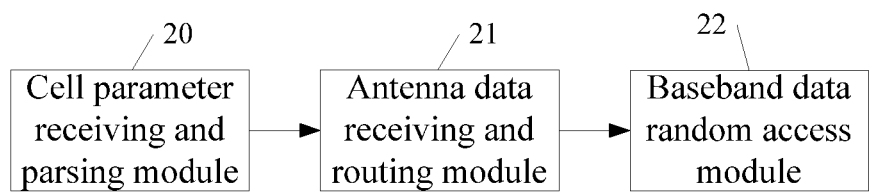
FIG. 2 is a schematic structural diagram showing a baseband data storage control device according to embodiments of the present disclosure.

Embodiments of the present disclosure further proposes a baseband data storage control device, as shown in FIG. 2, the baseband data storage control device according to embodiments of the present disclosure specifically includes: a cell parameter receiving and parsing module 20, an antenna data receiving and routing module 21, and a baseband data random access module 22, where, the cell parameter receiving and parsing module 20 is configured to receive cell configuration information of each subframe, and map each cell into a preset cell set according to bandwidth and quantity of antennas in the cell configuration information, where each cell set corresponds to a random storage region.

Here, the preset cell set includes four cell sets, and a maximum data throughput of each cell set is a data volume of a cell with bandwidth of 20 M and four antennas.

The antenna data receiving and routing module 21 is configured to analyze each cell included in each cell set and cell parameters corresponding to each cell, and compute storage addresses for each cell in the random storage region according to obtained cell parameters.

Here, the storage address actually is an offset address of each cell in a corresponding random storage region; and the cell parameter includes cell bandwidth, number of antennas, cell number and CP type, etc.

In practical application, the computing storage addresses for each cell according to obtained cell parameters by the antenna data receiving and routing module 21 includes: first classifying cells into four types according to cell bandwidth in practical application environment; then further classifying the cells into eight types according to number of antennas on a basis of the classifying according to cell bandwidth; then classifying the cells into nine types according to cell number on a basis of the classifying according to number of antennas; and finally obtaining the offset address of each symbol in each antenna of each type of cell according to situation of cyclic prefix on a basis of the classifying according to cell number.

The baseband data random access module 22 is configured to store received baseband data according to computed storage address.

Specifically, the baseband data random access module 22 determines a final storage address of baseband data for the received baseband data according to both the random storage region corresponding to the cell set mapped by the cell parameter receiving and parsing module 20 as well as the offset address computed by the antenna data receiving and routing module 21.

Here, the baseband data random access module 22 includes four random access memory groups for storing baseband data, and the four random access memory groups are corresponding to four cell sets preset by the cell parameter receiving and parsing module 20. Each random access memory group is composed of two random access memories including ping and pong. The baseband data random access module 22 includes eight simple 32×7200 dual-port random access memories in total.

In practical application, the cell parameter receiving and parsing module 20 and the antenna data receiving and routing module 21 may be implemented by a central processing unit (CPU), a microprocessor (MPU), a digital signal processor (DSP) or a field programmable gate array (FPGA) which are positioned in a terminal.

Figure 3:
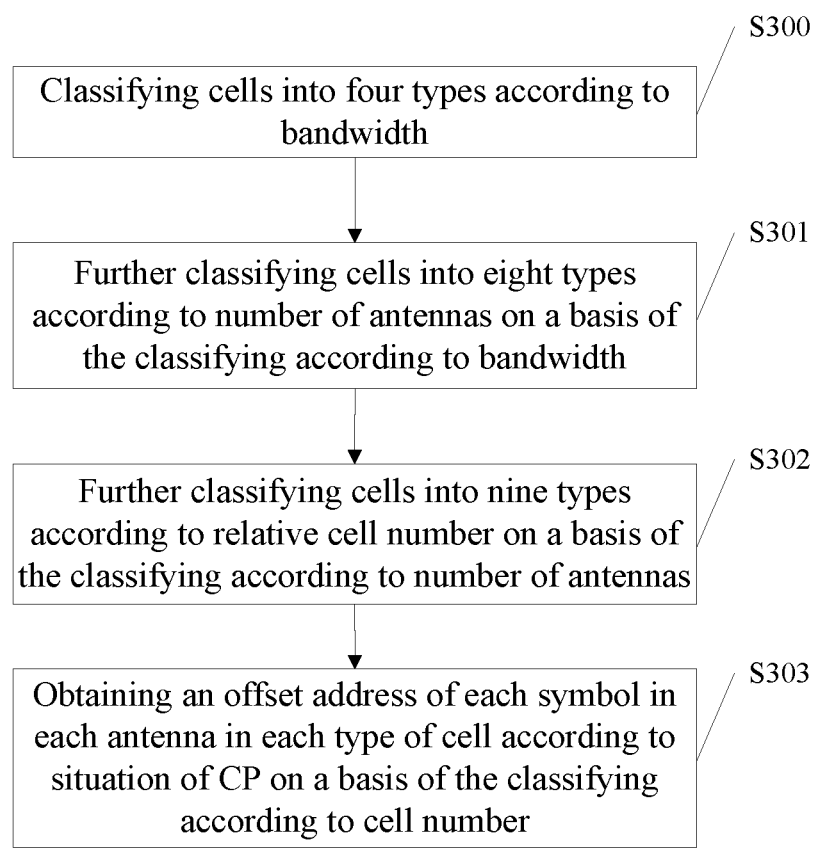
FIG. 3 is a schematic flow chart for implementing a method for computing storage addresses for each cell according to obtained cell parameters in embodiments of the present disclosure.

The flow for implementing a method for computing storage addresses for each cell according to obtained cell parameters in embodiments of the present disclosure is as shown in FIG. 3, and the method for computing storage addresses for each cell according to obtained cell parameters includes following steps.

Step S300: classifying cells into four types according to bandwidth.

Here, different values of bandwidth type (bw_type) signify different types, where 20 M/15 M belongs to a first type; 10 M belongs to a second type; 5 M belongs to a third type; and 3 M/1.4 MHz belongs to a fourth type.

Step S301: further classifying cells into eight types according to number of antennas on a basis of the classifying according to bandwidth in Step S300.

Here, different values of antenna type (ant_type) signify different types represented by a symbol of 3 bits, where:

a) 20 M/15 M: 8/4 antenna is a first type, which may be marked by 000; and 2/1 antenna is a second type, which may be marked by 001;

b) 10 M: 8 antenna is a third type, which may be marked by 010; and 4/2/1 antenna is a fourth type, which may be marked by 011;

c) 5 M: 8 antenna is a fifth type, which may be marked by 100; and 4/2/1 antenna is a sixth type, which may be marked by 101; and d) 3 M/1.4 M: 8 antenna is a seventh type, which may be marked by 110; and 4/2/1 antenna is a eighth type, which may be marked by 111.

Step S302: further classifying cells into nine types according to relative cell number on a basis of the classifying according to number of antennas in Step 301.

Here, different values of cell type (cell_type) signify different types.

Specifically, a cell number is allocated with priority according to cell bandwidth and number of antennas from most to least, where first sampling points of each symbol of each cell of each type have a same address, and classifying results are as shown in Table 3, which shows cell configuration types according to cell sequence number (Cell_rela_idx), bandwidth and antenna number (Bw and antenna config).

TABLE 3

| cell_type | Bw and antenna config | Cell_rela_idx |
|---|---|---|
| 1 | 20M/15M 8/4 antenna | 0 |
|   | 20M/15M 2/1 antenna | 0 |
|   | 20M/15M 2/1 antenna | 1 |
|   | 10M 4/2/1 antenna | 0 |
|   | 5M 4/2/1 antenna | 0 |
|   | 3M/1.4M 4/2/1 antenna | 0 |
| 2 | 10M 8 antenna | 0 |
|   | 5M 8 antenna | 0 |
|   | 3M/1.4M 8 antenna | 0 |
| 3 | 10M 4/2/1 antenna | 1 |
|   | 5M 4/2/1 antenna | 2 |
| 4 | 5M 8 antenna | 1 |
| 5 | 5M 4/2/1 antenna | 1 |
| 6 | 3M/1.4M 8 antenna | 1 |
| 7 | 3M/1.4M 8 antenna | 2 |
| 8 | 3M/1.4M 4/2/1 antenna | 1 |
| 9 | 3M/1.4M 4/2/1 antenna | 2 |

Step S303: obtaining an offset address of each symbol in each antenna in each type of cell according to situation of CP on a basis of the classifying according to cell number in Step S302.

The CP includes a normal CP and an extended CP; Table 4 shows offset addresses of each symbol with nine types of cells under the normal CP of a single antenna; and Table 5 shows offset addresses of each symbol with nine types of cells under the extended CP of a single antenna.

TABLE 4

| | type | | | | | | | | |
|---|---|---|---|---|---|---|---|---|---|
| symb_id | 1 | 2 | 3 | 4 | 5 | 6 | 7 | 8 | 9 |
| 0 | 0 | 0 | 150 | 75 | 75 | 50 | 100 | 50 | 100 |
| 1 | 300 | 150 | 450 | 225 | 375 | 200 | 250 | 350 | 400 |
| 2 | 600 | 300 | 750 | 375 | 675 | 350 | 400 | 650 | 700 |
| 3 | 0 | 0 | 150 | 75 | 75 | 50 | 100 | 50 | 100 |
| 4 | 900 | 450 | 1050 | 525 | 975 | 500 | 550 | 950 | 1000 |
| 5 | 1200 | 600 | 1350 | 675 | 1275 | 650 | 700 | 1250 | 1300 |
| 6 | 1500 | 750 | 1650 | 825 | 1575 | 800 | 850 | 1550 | 1600 |
| 7 | 1800 | 900 | 1950 | 975 | 1875 | 950 | 1000 | 1850 | 1900 |
| 8 | 2100 | 1050 | 2250 | 1125 | 2175 | 1100 | 1150 | 2150 | 2200 |
| 9 | 2400 | 1200 | 2550 | 1275 | 2475 | 1250 | 1300 | 2450 | 2500 |
| 10 | 300 | 150 | 450 | 225 | 375 | 200 | 250 | 350 | 400 |
| 11 | 2700 | 1350 | 2850 | 1425 | 2775 | 1400 | 1450 | 2750 | 2800 |
| 12 | 3000 | 1500 | 3150 | 1575 | 3075 | 1550 | 1600 | 3050 | 3100 |
| 13 | 3300 | 1650 | 3450 | 1725 | 3375 | 1700 | 1750 | 3350 | 3400 |

TABLE 5

| | type | | | | | | | | |
|---|---|---|---|---|---|---|---|---|---|
| Symb id | 1 | 2 | 3 | 4 | 5 | 6 | 7 | 8 | 9 |
| 0 | 0 | 0 | 150 | 75 | 75 | 50 | 100 | 50 | 100 |
| 1 | 300 | 150 | 450 | 225 | 375 | 200 | 250 | 350 | 400 |
| 2 | 0 | 0 | 150 | 75 | 75 | 50 | 100 | 50 | 100 |
| 3 | 600 | 300 | 750 | 375 | 675 | 350 | 400 | 650 | 700 |
| 4 | 900 | 450 | 1050 | 525 | 975 | 500 | 550 | 950 | 1000 |
| 5 | 1200 | 600 | 1350 | 675 | 1275 | 650 | 700 | 1250 | 1300 |
| 6 | 1500 | 750 | 1650 | 825 | 1575 | 800 | 850 | 1550 | 1600 |
| 7 | 1800 | 900 | 1950 | 975 | 1875 | 950 | 1000 | 1850 | 1900 |
| 8 | 300 | 150 | 450 | 225 | 375 | 200 | 250 | 350 | 450 |
| 9 | 2100 | 1050 | 2250 | 1125 | 2175 | 1100 | 1150 | 2150 | 2200 |
| 10 | 2400 | 1200 | 2550 | 1275 | 2475 | 1250 | 1300 | 2450 | 2500 |
| 11 | 2700 | 1350 | 2850 | 1425 | 2775 | 1400 | 1450 | 2750 | 2800 |

Here, symb id in Table 4 and Table 5 represents a symbol sequence number.

Therefore, offset addresses (ser_ant_offs_addr) of baseband data between antennas are obtained by synthesizing the ant_type, cell CP type (cell_cp_type) and antenna index (ant_idx[1:0]) in above-mentioned steps, and are as shown in Table 6, which shows offset addresses of different antennas in cells. Where, regard the normal CP, a value of the CP is 0; and regard the extend CP, a value of the CP is 1.

For example, when ant_idx[1:0] is 2'b01, and {cell_cp_type,ant_type} is 4'b0_000, 4'b0_001, 4'b0_011, 4'b0_101 and 4'b0_111, ser_ant_offs_addr is 3600=3300 (corresponding to an offset address with a type of 1 and a symb id of 13 in Table 4)+300 (gaps of offset addresses in a column in which type is 1); the rest may be deduced by analogy.

TABLE 6

| ant_idx[1:0] | {cell_cp_type, ant_type} | ser_ant_offs_addr |
|---|---|---|
| 2'b00 | all | 0 |
| 2'b01 | 4'b0_000, 4'b0_001, 4'b0_011, 4'b0_101, 4'b0_111, | 3600 |
|   | 4'b0_010, 4'b0_100, 4'b0_110, | 1800 |
|   | 4'b1_000, 4'b1_001, 4'b1_011, 4'b1_101, 4'b1_111, | 3000 |
|   | 4'b1_010, 4'b1_100, 4'b1_110, | 1500 |
| 2'b10 | 4'b0_000, 4'b0_001, 4'b0_011, 4'b0_101, | 0 |

TABLE 6-continued

| ant_idx[1:0] | {cell_cp_type, ant_type} | ser_ant_offs_addr |
|---|---|---|
| | 4'b0_111, 4'b1_000, 4'b1_001, 4'b1_011, 4'b1_101, 4'b1_111, | |
| | 4'b0_010, 4'b0_100, 4'b0_110, | 3600 |
| | 4'b1_010, 4'b1_100, 4'b1_110, | 3000 |
| 2'b11 | 4'b0_000, 4'b0_001, 4'b0_011, 4'b0_101, 4'b0_111, | 3600 |
| | 4'b0_010, 4'b0_100, 4'b0_110, | 5400 |
| | 4'b1_000, 4'b1_001, 4'b1_011, 4'b1_101, 4'b1_111, | 3000 |
| | 4'b1_010, 4'b1_100, 4'b1_110, | 4500 |

The foregoing method for computing a storage address for symbols on each antenna of each cell according to obtained cell parameters, regularly determines an offset address, in each random access memory (RAM), of symbol data of each antenna in each cell.

On this basis, when considering resource consumption and data access restriction of hardware on different antennas in different cells in practice, considering that multi-antenna data often needs to be read simultaneously for operations such as subsequent channel estimation, frequency offset estimation and MIMO equalization, and considering that access of antenna data on each RAM would be restricted to only one read port and one write port when simple dual-port RAMs as less as possible in number of plates are selected in aspect of RAM resources. Therefore, a certain setting of other relevant storage location rules is required, which is discussed case by case.

In order that symbol data of different antennas can be read out simultaneously, a setting of a RAM corresponding to each symbol datum of each antenna is required. The setting specifically includes:

Regarding a configuration of a cell with 8 antennas (except 8 antennas and 20 M): when antenna indexes are 0 and 4 and a modulo-4 sample point counter is 0~3 in sequence, selections of four baseband data RAMs are RAM0, RAM1, RAM2 and RAM3 in sequence; when antenna indexes are 1 and 5 and a modulo-4 sample point counter is 0~3 in sequence, selections of four baseband data RAMs are RAM3, RAM0, RAM1 and RAM2 in sequence; when antenna indexes are 2 and 6 and a modulo-4 sample point counter is 0~3 in sequence, selections of four baseband data RAMs are RAM2, RAM3, RAM0 and RAM1 in sequence; and when antenna indexes are 3 and 7 and a modulo-4 sample point counter is 0~3 in sequence, selections of four baseband data RAMs are RAM1, RAM2, RAM3 and RAM0 in sequence.

Regarding a configuration of a cell with antennas which are not 8 in number (including 8 antennas and 20 M): when antenna indexes are 0 and 4, or 2 and 6, and a modulo-4 sample point counter is 0~3 in sequence, selections of four baseband data RAMs are RAM0, RAM1, RAM2 and RAM3 in sequence; and when antenna indexes are 1 and 5, or 3 and 7, and a modulo-4 sample point counter is 0~3 in sequence, selections of four baseband data RAMs are RAM3, RAM0, RAM1 and RAM2 in sequence.

According to above settings, a data storage format of a cell with 4 antennas and 20 M is as shown in FIG. 4. In such a RAM group, a specific storage arrangement of data of antenna 0 is as shown in FIG. 5, and data of other three antennas are arranged downwardly in sequence.

The above is data arrangement of an antenna in a cell having a bandwidth of 20 M. In case of a cell having other bandwidths, arranging in order within a data scope of an antenna having a bandwidth of 20 M according to bandwidths decreased in equal proportion, of which a rule is as shown in Table 7 showing settings of offset addresses of cells having bandwidths of 20 M and less within a symbol.

TABLE 7

| Bandwidth | Ant_num | Cell index | Address index |
|---|---|---|---|
| 20 MHz | 8 | Cell0 | addr0~addr299 |
| | 4 | Cell0 | addr0~addr299 |
| | 2/1 | Cell0 | addr0~addr299 |
| | | Cell1 | addr0~addr299 |
| 15 MHz | 8 | Cell0 | addr0~addr224 |
| | 4 | Cell0 | addr0~addr224 |
| | 2/1 | Cell0 | addr0~addr224 |
| | | Cell1 | addr0~addr224 |
| 10 MHz | 8 | Cell0 | addr0~addr149 |
| | 4/2/1 | Cell0 | addr0~addr149 |
| | | Cell1 | addr150~addr299 |
| 5M | 8 | Cell0 | addr0~addr74 |
| | | Cell1 | addr75~addr149 |
| | 4/2/1 | Cell0 | addr0~addr74 |
| | | Cell1 | addr75~addr149 |
| | | Cell2 | addr150~addr224 |
| 3M/1.4 MHz | 8/4/2/1 | Cell0 | addr0~addr49 |
| | | Cell1 | addr50~addr99 |
| | | Cell2 | addr100~addr149 |

According to above descriptions of a cell with 4 antennas and 20 M and settings for symbol storage location rules of multiple cells having small bandwidth, correspondingly, a data storage format of a cell with 8 antennas and 10 M is as shown in FIG. 6.

Distribution specifically orientating to a symbol datum of an antenna is as shown in FIG. 7.

On this basis and in combination with rule settings of address of symbol data having different bandwidths, correspondingly, a data storage format of two cells each with 8 antennas and 5 M is as shown in FIG. 8. By taking a first symbol of antenna 0 as an example, original storage addresses of one cell with 8 antennas and 10 M are 0~149, however storage addresses of two cells cell0 and cell1 each with 8 antennas and 5 M now are 0~74 and 75~149 in sequence. Storage addresses of each symbol under other antennas can be obtained by adding symbol offset and antenna offset addresses to an address of a first symbol of antenna 0.

Further, a data storage format of three cells each with 8 antennas and 3/1.4 M is as shown in FIG. 9, and is similar to a data storage format of one cell with 8 antennas and 10 M. By taking a first symbol of antenna 0 as an example, original storage addresses of one cell with 8 antennas and 10 M are 0~149, however storage addresses of three cells cell0, cell1 and cell2 each with 8 antennas and 3/1.4 M are 0~49, 50~99 and 100~149 in sequence. Storage addresses of each symbol under other antennas can be obtained by adding symbol offset and antenna offset addresses to an address of a first symbol of antenna 0.

Embodiments of the present disclosure further record a storage medium storing a computer program which is configured to execute the baseband data storage control method set forth in aforementioned embodiments.

The abovementioned embodiments are merely embodiments of the present disclosure, and are not intended to limit a scope of protection of the present disclosure.

INDUSTRIAL APPLICABILITY

In the present disclosure, on a basis of an overall consideration of different bandwidths, number of cells, number of antennas, TDD and CP, baseband data are subjected to optimized storage control according to a regular rule which not only can flexibly support addressing of baseband data under various configurations, thereby meeting convenience for data reading and storing in subsequent baseband processing steps, but also can maximize multiplexing of storage space to reduce consumption of hardware resources.

What is claimed is:

1. A baseband data storage control method, comprising:
receiving cell configuration information in each subframe, mapping each cell into a preset cell set according to bandwidth and quantity of antennas in the cell configuration information, wherein each cell set corresponds to a random storage region;
analyzing each cell included in each cell set and cell parameters corresponding to each cell, and computing storage addresses for each cell in the random storage region according to obtained cell parameters; and
storing received baseband data into a random storage region corresponding to a cell to which the baseband data belong, according to the computed storage address.

2. The method according to claim 1, wherein, the preset cell set comprises four cell sets, and a maximum data throughput of each cell set is a data volume of a cell with bandwidth of 20 M and four antennas.

3. The method according to claim 1, wherein, the cell parameters comprise cell bandwidth, number of antennas, cell number and cyclic prefix type.

4. The method according to claim 1, wherein, the computing storage addresses for each cell in the random storage region according to obtained cell parameters comprises:
first classifying cells into four types according to cell bandwidth; then classifying the cells into eight types according to number of antennas on a basis of the classifying according to the cell bandwidth; then classifying the cells into nine types according to the cell number on a basis of the classifying according to number of antennas; and finally obtaining an offset address of each symbol received by each antenna of each type of cell according to cyclic prefix on a basis of the classifying according to cell number.

5. The method according to claim 1, wherein, the random storage region comprises four random access memory groups configured to store baseband data; and each random access memory group is composed of two random access memories including ping and pong.

6. A baseband data storage control device, comprising: a cell parameter receiving and parsing module, an antenna data receiving and routing module and a baseband data random access module, wherein,
the cell parameter receiving and parsing module is configured to receive cell configuration information in each subframe, and map each cell into a preset cell set according to bandwidth and quantity of antennas in the cell configuration information, wherein each cell set corresponds to a random storage region;
the antenna data receiving and routing module is configured to analyze each cell included in each cell set and cell parameters corresponding to each cell, and compute storage addresses for each cell in the random storage region according to obtained cell parameters; and
the baseband data random access module is configured to store received baseband data into a random storage region corresponding to a cell to which the baseband data belong, according to the computed storage address.

7. The device according to claim 6, wherein, the preset cell set comprises four cell sets, and a maximum data throughput of each cell set is a data volume of a cell with bandwidth of 20 M and four antennas.

8. The device according to claim 6, wherein, the cell parameters comprise cell bandwidth, number of antennas, cell number and cyclic prefix type.

9. The device according to claim 6, wherein, the computing, by the antenna data receiving and routing module, storage addresses for each cell in the random storage region according to obtained cell parameters comprises:
first classifying cells into four types according to cell bandwidth; then classifying the cells into eight types according to number of antennas on a basis of the classifying according to the cell bandwidth; then classifying the cells into nine types according to the cell number on a basis of the classifying according to number of antennas; and finally obtaining an offset address of each symbol in each antenna of each type of cell according to cyclic prefix on a basis of the classifying according to cell number.

10. The device according to claim 6, wherein, the baseband data random access module comprises four random access memory groups configured to store baseband data; and each random access memory group is composed of two random access memories including ping and pong.

11. A non-transitory storage medium storing a computer program which is configured to execute the baseband data storage control method according to claim 1.

12. The method according to claim 2, wherein, the computing storage addresses for each cell in the random storage region according to obtained cell parameters comprises:
first classifying cells into four types according to cell bandwidth; then classifying the cells into eight types according to number of antennas on a basis of the classifying according to the cell bandwidth; then classifying the cells into nine types according to the cell number on a basis of the classifying according to number of antennas; and finally obtaining an offset address of each symbol received by each antenna of each type of cell according to cyclic prefix on a basis of the classifying according to cell number.

13. The method according to claim 3, wherein, the computing storage addresses for each cell in the random storage region according to obtained cell parameters comprises:
first classifying cells into four types according to cell bandwidth; then classifying the cells into eight types according to number of antennas on a basis of the classifying according to the cell bandwidth; then classifying the cells into nine types according to the cell number on a basis of the classifying according to number of antennas; and finally obtaining an offset address of each symbol received by each antenna of each type of cell according to cyclic prefix on a basis of the classifying according to cell number.

14. The method according to claim 2, wherein, the random storage region comprises four random access memory groups configured to store baseband data; and each random access memory group is composed of two random access memories including ping and pong.

15. The method according to claim 3, wherein, the random storage region comprises four random access memory groups configured to store baseband data; and each random access memory group is composed of two random access memories including ping and pong.

16. The device according to claim 7, wherein, the computing, by the antenna data receiving and routing module, storage addresses for each cell in the random storage region according to obtained cell parameters comprises:

first classifying cells into four types according to cell bandwidth; then classifying the cells into eight types according to number of antennas on a basis of the classifying according to the cell bandwidth; then classifying the cells into nine types according to the cell number on a basis of the classifying according to number of antennas; and finally obtaining an offset address of each symbol in each antenna of each type of cell according to cyclic prefix on a basis of the classifying according to cell number.

17. The device according to claim 8, wherein, the computing, by the antenna data receiving and routing module, storage addresses for each cell in the random storage region according to obtained cell parameters comprises:

first classifying cells into four types according to cell bandwidth; then classifying the cells into eight types according to number of antennas on a basis of the classifying according to the cell bandwidth; then classifying the cells into nine types according to the cell number on a basis of the classifying according to number of antennas; and finally obtaining an offset address of each symbol in each antenna of each type of cell according to cyclic prefix on a basis of the classifying according to cell number.

18. The device according to claim 7, wherein, the baseband data random access module comprises four random access memory groups configured to store baseband data; and each random access memory group is composed of two random access memories including ping and pong.

19. The device according to claim 8, wherein, the baseband data random access module comprises four random access memory groups configured to store baseband data; and each random access memory group is composed of two random access memories including ping and pong.

20. A non-transitory storage medium storing a computer program which is configured to execute the baseband data storage control method according to claim 2.

\* \* \* \* \*